United States Patent [19]

Elmore et al.

[11] 4,416,567

[45] Nov. 22, 1983

[54] METHOD AND APPARATUS FOR TRANSPORTING MINED PARTICLES FROM AN ELEVATED SITE

[75] Inventors: Carl L. Elmore; Erwin D. Funk, both of Glens Falls, N.Y.

[73] Assignee: Kamyr, Inc., Glens Falls, N.Y.

[21] Appl. No.: 349,817

[22] Filed: Feb. 18, 1982

[51] Int. Cl.³ .............................................. B65G 53/33
[52] U.S. Cl. ...................................... 406/63; 406/105; 406/106
[58] Field of Search ................... 406/62, 63, 105, 106, 406/168, 173, 175, 197; 210/512.1, 512.2

[56] References Cited

FOREIGN PATENT DOCUMENTS 493626 5/1950 Belgium ............................... 406/106

Primary Examiner—John J. Love
Assistant Examiner—Paul A. Sobel

[57] ABSTRACT

A method of transporting heavier than water particles such as coal from an elevated supply site to a delivery site at a substantial elevation below said elevated supply site comprising the steps of mixing the particles at the supply site with liquid such as water to form a slurry of particles and liquid, introducing slurry at the supply site into a confined path extending downwardly from the supply site to the delivery site, confining a volume of slurry material in energy transmitting relation to the slurry in the confined path such that the static head of the slurry in the confined path is transmitted to the confined volume, continuously withdrawing material from the confined volume at spaced first and second positions and introducing liquid into the confined volume in such a way as to (1) maintain the pressure conditions within the confined volume generally equal to the static head of the slurry in the confined path minus the friction losses and (2) enable slurry from the confined path to flow into the confined volume and the particles thereof to move within the confined volume such that the material at the first withdrawal position contains the larger particles of the slurry and the material at the second withdrawal position is substantially devoid of the larger particles of the slurry, continuously separating a liquid fraction from the material withdrawn from the confined volume at the second withdrawal position in such a way that the pressure of said liquid fraction is not materially lowered with respect to the pressure of the material in the confined volume, pumping the liquid fraction along a confined path extending upwardly to the supply site, and utilizing the liquid fraction pumped to the supply site as the liquid in the mixing step, and apparatus for carrying out the method.

15 Claims, 1 Drawing Figure

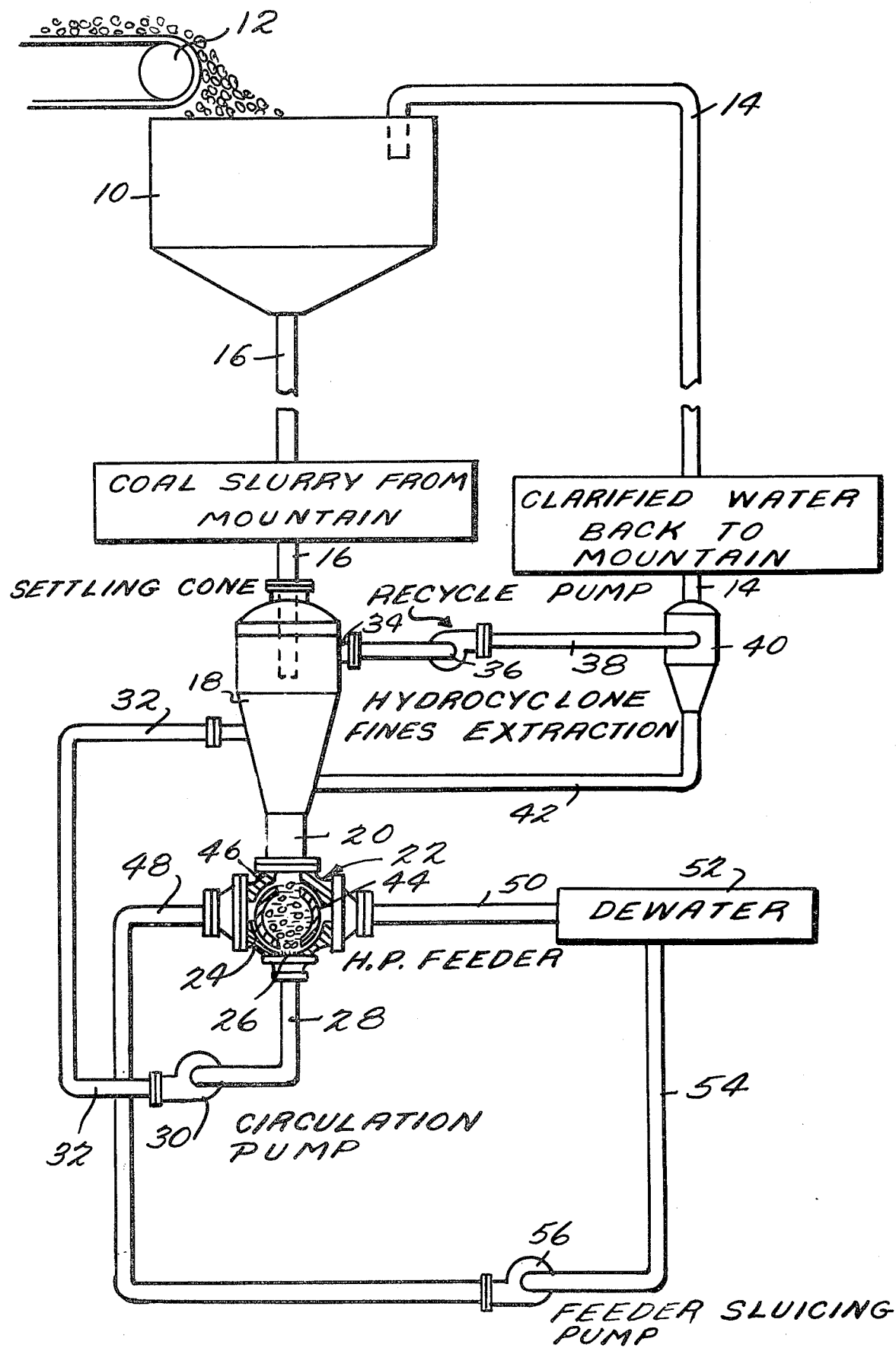

METHOD AND APPARATUS FOR TRANSPORTING MINED PARTICLES FROM AN ELEVATED SITE

This invention relates to mining and more particularly to the transportation of mined particles from an elevated mine to a processing site substantially therebelow.

There are many situations presented in which mines are located high in mountainous areas necessitating the transportation or movement of the mined particles from the elevated site of the mine within the mountains to a delivery position or site in the valley below. Examples of mines which present situations of this type include coal mines, oil shale, ores, lignite and the like, all of which result in the production of particles heavier than water. In many of these situations the elevation difference presented is 1,000 feet or more and a typical conventional system utilized to effect transportation of the mined particles downwardly from the elevated supply site is a water sluicing system. A typical water sluicing system may, for example, involve the transportation of 200 tons of coal per hour down a slope which has a distance of 2,300 feet with an elevation difference of 1,000 feet. Such an exemplary embodiment requires the construction of a material sluice extending down the slope 2,300 feet. In order to insure movement of material along the sluice, conventional systems utilize water in the sluice and for this purpose it becomes necessary to re-circulate the water back up the slope, pumping against the 1,000 feet of static head plus friction loss in the return pipe. In the example noted, a typical friction loss for 2,300 feet of return pipe line is 70 feet of water so that the total pump head required is 1,070 feet of water. The power required for an 80% efficient pump is 845 BHP or 630 kilowatts.

It is an object of the present invention to provide a system for transporting mined particles from an elevated mine supply site to a delivery site substantially therebelow which materially reduces the energy requirements of the typical conventional sluicing system as noted above. In accordance with the principles of the present invention this objective is obtained by confining the slurry within a pipeline which leads to a vessel capable of confining a volume of slurry material in energy transmitting relation to the slurry in the confined path defined by the slurry pipeline such that the static head of the slurry is transmitted to the confined volume. Slurry material is continuously withdrawn from the confined volume at spaced first and second withdrawal positions and liquid is continuously introduced into the confined volume in such a way as to (1) maintain the pressure conditions within the confined volume generally equal to the static head of the slurry in the pipeline minus friction losses and (2) enable slurry from the pipeline to flow into the confined volume within the vessel and the particles thereof to move within the confined volume such that the material at the first withdrawal position contains the larger particles of the slurry and the material at the second withdrawal position is substantially devoid of the larger particles of the slurry. The material withdrawn from the confined volume at the second withdrawal position is subject to a continuous separation treatment so as to obtain a liquid fraction the pressure of which is not materially lowered with respect to the pressure of the material in the confined volume. This liquid fraction can then be pumped upwardly to the supply site to mix with mined particles to form slurry. In this way, the potential energy or static head of the slurry is not completely dissipated but rather is utilized to substantially effect the movement of the replenishing liquid back up to the elevated supply site. Under these circumstances the pump energy required to effect the movement of the water back up to the supply site need only be enough to overcome the friction losses in the return pipe and those which have occurred with respect to the separation and the flow of the slurry into the vessel. Utilizing the previous example, and assuming friction losses in the slurry pipeline of 70 feet of water and a pressure loss in the separator of 40 feet of water, then the total pump head required is 70 feet of water plus 40 feet of water plus 70 feet of water friction loss in the return pipeline, or a total of 180 feet of water. The power required for an 80% efficient pump is 160 BHP or 120 kw.

The other energy input required to maintain the pressure conditions within the vessel, such as the electricity required to move the electric motor of a transfer device utilized in the withdrawal circuit extending from the first withdrawal position and the two pumps associated with the exterior circuitry of the transfer device, can be assumed to consume a total horsepower of 75 BHP or 55 kw so that the complete power requirement of the present system is 175 kw as compared with the 630 kw previously noted. Moreover, the cost of the present system compared favorably with the cost of the aforesaid conventional system with the significant lower energy operating costs noted above.

Accordingly it is a further object of the present invention to provide apparatus of the type described which is simple in construction, effective in operation and economical to manufacture and maintain.

These and other objects of the present invention will become more apparent during the course of the following detailed description and appended claims.

The invention may best be understood with reference to the accompanying drawing, wherein an illustrative embodiment is shown.

In the drawing:

There is shown apparatus embodying the principles of the present invention suitable to carry out the method of the invention.

Referring now more particularly to the drawing, there is illustrated therein a mixing tank 10 which is disposed at the elevated supply site. The mixing tank receives particles from the mine as from a conveyor 12 and water from a water return pipeline 14. Mined particles and water mixed within the mixing tank 10 form a slurry which is introduced to the upper end of a slurry pipeline 16. Slurry pipeline 16 extends from the elevated supply site down to the delivery site a substantial distance below the supply site. In a typical example where the supply site constitutes a coal mine, the delivery site would constitute a coal separation plant at a lower elevation of 1,000 feet or more. In this regard it will be understood that the term "supply site" comprehends within its meaning not only the position at the mine entrance where the slurry pipeline begins, but the entire mine installation itself. In this regard it will be understood that the mixing of the mined particles and water to form the slurry may take place within the mine in accordance with the teachings contained in commonly-assigned U.S. Pat. No. 4,082,368, the disclosure of which is hereby incorporated by reference into the present specification.

The slurry pipeline 16 extends from the elevated supply site downwardly to the delivery site and feeds into the interior of a pressure vessel 18. As shown, the pressure vessel has its lower end formed into a frustoconical configuration from which slurry material contained within the vessel 18 is withdrawn at a first position of withdrawal through a short withdrawal pipe 20. Pipe 20 forms a part of a first circuitous path for the flow of material withdrawn from the vessel 18 which path extends through an exchange position wherein a transfer device 22 is mounted. As shown, the first circuitous path thus includes pipe section 20 leading to an upper opening in a housing 24 of the transfer device 22, the first circuitous path also including a lower opening in the housing 24 having a screen 26 mounted therein. From the screen the first circuitous path is defined by a pipe 28 which leads to the suction side of a pump 30, the pressure side of which is connected with a pipe 32 leading back to the vessel 18.

The operation of the transfer device 22 and the pump 30 within the first circuitous path is such as to maintain the pressure within the vessel 18 generally equal to the static head of the slurry in the slurry pipeline 16 minus friction losses occurring as a result of flow in the slurry pipeline 16. The manner in which slurry material is removed from the vessel 18 and introduced therein with respect to the first circuitous path not only serves to maintain the pressure conditions within the vessel as aforesaid, but also serves to enable slurry in the pipeline 16 to flow into the vessel and the particles thereof once inside the vessel to move in such a way that the larger particles tend to collect adjacent the withdrawal pipe section 20.

The return pipeline 14 is communicated with the vessel 18 at a second position spaced from the withdrawal pipe section 20 at the upper portion of the vessel where the aforesaid movement of particles results in the material of withdrawal being substantially devoid of the larger particles of the slurry. As shown, at the second position of withdrawal there is a withdrawal pipe section 34 which leads to the suction side of a liquid recycling pump 36, the pressure side of which feeds to a pipe 38 forming the feed pipe of a hydrocyclone separator 40. The hydrocyclone separator 40 serves to separate the material fed thereto into a liquid fraction which is introduced into the lower end of the liquid return pipeline 14 and a small particle fraction which is discharged from the lower apex of the hydrocyclone 40 into a pipe 42 which feeds back into the interior of the vessel 18 at a position adjacent the withdrawal pipe 20 remote from the withdrawal pipe 34 at the second position of withdrawal. It can thus be seen that the pressure of the material within the vessel 18 which is retained by virtue of the circulation in the first circuitous path as aforesaid is connected with the water return pipeline 14 through the pump 36 and hydrocyclone 40. Pump 36 is selected therefore to supply a head energy sufficient to overcome the friction loss in the return pipeline 14, the pressure loss in the hydrocyclone 40 and the friction loss in the static head of the slurry resulting from the flow of slurry through the slurry pipeline 16.

In the arrangement thusfar described, it will be noted that the end of the slurry pipeline 16 extends into the interior of the vessel 18 so that its open discharge end is approximately in the upper central portion of the confined volume within the vessel. This arrangement further promotes the flow of particles in the slurry issuing from the discharge end of the slurry pipeline within the confined volume such that the larger particles tend to move toward the first position of withdrawal at the withdrawal pipe section 20. In an exemplary embodiment, the size range of these larger particles is all those larger than 28 mesh or 1 mm nominal diameter. Conversely, the particles in the slurry issuing into the confined volume of the vessel which move toward the second position of withdrawal and flow outwardly through the withdrawal pipe section 34 include substantially only particles of a size 28 mesh or less, or less than 1 mm nominal diameter. In this way, pump 36 acts only on fine particles and is substantially devoid of engagement by the larger particles which move toward the first position of withdrawal and out of the vessel through withdrawal pipe 20. Likewise, the screen 26 of the transfer device 22 is sized conveniently within a range of from 1 mm to 8 mm with a typical specific example being 7.5 mm nominal diameter so that the largest particle that is allowed to pass therethrough is a particle 7.5 mm nominal diameter or less. Here again, pump 30 therefore need only engage relatively small particles.

The position within the vessel 18 where these smaller particles are returned by pipe 32 is below the discharge end of pipeline 16 but above the point of entry of pipe 42. This entry point insures that fine particles can only go down, or round and round in the circulation path if they get through screen 26. Consequently, the fine particles must migrate into a position to be discharged with the large particles by virtue of the operation of transfer device 22.

The construction and operation of the preferred transfer device 22 is conventional and a detailed disclosure thereof is contained in the aforesaid U.S. Pat. No. 4,082,368. In this regard, see also the disclosure contained in commonly assigned U.S. Pat. No. 3,982,789, the disclosure of which is hereby incorporated by reference into the present specification. For present purposes suffice it to say that the device 22 includes a rotor 44 rotatably mounted within the housing 24 and suitably driven by an electric motor (not shown). The rotor 44 is formed with a series of through pockets 46. These pockets serve to communicate the upper housing opening connected with withdrawal pipe section 20 with the screened housing opening connected with the pipe 28 and two housing openings displaced 90° with respect thereto which are connected with inlet and outlet pipes 48 and 50 forming a part of a second circuitous path. The pockets 46 within the rotor are positioned both in side-by-side relationship and in angularly related relationship with respect to one another so that one pocket is always in communication across both sets of pipes and so that the flow rate between each set of pipes remains substantially constant. Thus, with respect to each set of pipes there is either a single pocket fully communicating therebetween or variable portions of two pockets communicating therebetween, which portions add up to a flow rate of a full pocket. The second circuitous path includes a slurry delivery vessel or sump 52 which is fed from pipe or conduit 50. As previously indicated, this sump preferably could form part of a separation plant in which case the slurry would be treated in accordance with usual practices. For exemplary purposes the sump 52 constitutes simply a settling tank from which a liquid fraction is withdrawn as by a pipe 54 forming a part of the second circuitous path and leading to the suction side of a feeder pump 56, the pressure side of which is connected with pipe or conduit 48.

With the above in mind, it can be seen that the rotation of the rotor 44 of the transfer device 22 has the effect of exchanging incremental volumes of blocked particles and slurry from the first circuitous path to the second circuitous path, while simultaneously exchanging corresponding incremental volumes of water from the second circuitous path to the first circuitous path. The pressure requirements of the feeder pump 56 which acts only on water need only be sufficient to overcome the friction loss in the second circuitous path and any pressure loss occasioned by the locational differences between the transfer device 22 and the separator sump 52.

It can thus be seen that the present system is able to effect transportation of the particles from the elevated supply site with water supplied from the lower delivery elevation without the necessity of pressurizing the return water from the atmospheric pressure condition normally found at the delivery site. Instead, a substantial portion of the static head of the slurry flowing from the elevated supply site to the lower delivery site is utilized to effect the recycling of the water from the lower delivery site to the upper elevated supply site.

It will thus be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A method of transporting heavier than water particles from an elevated supply site to a delivery site at a substantial elevation below said elevated supply site comprising the steps of mixing the particles at said supply site with liquid to form a slurry of particles and liquid, introducing slurry at said supply site into a confined path extending downwardly from said supply site to said delivery site, confining a volume of slurry material in energy transmitting relation to the slurry in said confined path such that the static head of the slurry in said confined path is transmitted to the confined volume, continuously withdrawing material from said confined volume at spaced first and second positions and introducing liquid into said confined volume in such a way as to (1) maintain the pressure conditions within said confined volume generally equal to the static head of the slurry in said confined path minus friction losses and (2) enable slurry from said confined path to flow into said confined volume and the particles thereof to move within the confined volume such that the material at the first withdrawal position contains the larger particles of the slurry and the material at the second withdrawal position is substantially devoid of the larger particles of the slurry, continuously separating a liquid fraction from the material withdrawn from the confined volume of said second withdrawal position in such a way that the pressure of said liquid fraction is not materially lowered with respect to the pressure of the material in said confined volume, pumping the liquid fraction along a confined path extending upwardly to said supply site, and utilizing the liquid fraction pumped along said upwardly extending confined path at said supply site as the liquid in said mixing step.

2. A method as defined in claim 1 wherein said particles are coal particles and said liquid is water.

3. A method as defined in claim 1 wherein the larger particles which move toward said first withdrawal position are larger than 1 mm nominal diameter.

4. A method as defined in claim 1, 2 or 3 wherein the material withdrawn from said first withdrawal position is induced to flow along a first circuitous path extending through an exchange position where the particles in the flow greater than a predetermined size are screened so as to prevent further movement thereof along said first circuitous path, a supply of liquid is pumped along a second circuitous path extending through said exchange position, and successive incremental volumes of screened particles and slurry from said first circuitous path are exchanged with corresponding successive incremental volumes of liquid from said second circuitous path while substantially maintaining the energy level of the flow in each circuitous path.

5. A method as defined in claim 4 wherein said predetermined size is approximately 1 mm nominal diameter.

6. A method as defined in claim 5 wherein the incremental volumes of screened particles and slurry exchanged from said first circuitous path to said second circuitous path are subject to a separation treatment within said second circuitous path so as to provide the supply of water pumped along said second circuitous path.

7. A method as defined in claim 6 wherein the incremental volumes of liquid exchanged from said second circuitous path to said first circuitous path are pumped along said first circuitous path back into said confined volume.

8. A method as defined in claim 1, 2 or 3 wherein the continuous separation of said liquid fraction from the material withdrawn from the confined volume at said second withdrawal position also results in the continuous formation of a smaller particle fraction which is fed back into the confined volume at a position remote from said second withdrawal position.

9. Apparatus for transporting heavier than water particles from an elevated supply site to a delivery site at a substantial elevation below said elevated supply site comprising a slurry pipeline extending from said supply site downwardly to said delivery site, means for mixing the particles at said supply site with liquid to form a slurry of particles and liquid and for introducing the slurry into said slurry pipeline, a vessel for confining a volume of slurry material in energy transmitting relation to the slurry in said slurry pipeline such that the static head of the slurry in said slurry pipeline is transmitted to the confined volume, means for continuously withdrawing material from said confined volume at spaced first and second positions and introducing liquid into said confined volume in such a way as to (1) maintain the pressure conditions within said confined volume generally equal to the static head of the slurry in said pipeline minus friction losses and (2) enable slurry from said slurry pipeline to flow into said confined volume and the particles thereof to move within the confined volume such that the material at the first withdrawal position contains the larger particles of the slurry and the material at the second withdrawal position is substantially devoid of the larger particles of the slurry, means for continuously separating a liquid fraction from the material withdrawn from the confined volume at said second withdrawal position in such a way that the pressure of said liquid fraction is not materially lowered with respect to the pressure of the material in said confined volume, a liquid pipeline extending upwardly from said delivery site to said supply site, means for pumping the liquid fraction along said liquid pipeline extending upwardly to said supply site so that the same can be used as the liquid in said mixing means.

10. Apparatus as defined in claim 9 wherein the material withdrawn from said first withdrawal position is received within means defining a first circuitous path extending through an exchange position, screening means within said first circuitous path at said exchange position for preventing further movement of particles greater than a predetermined size along said first circuitous path, means defining a second circuitous path extending through said exchange position, means for pumping a supply of liquid along said second circuitous path, and means at said exchange position for exchanging successive incremental volumes of screened particles and slurry from said first circuitous path with corresponding successive incremental volumes of liquid from said second circuitous path while substantially maintaining the energy level of the flow in each circuitous path.

11. Apparatus as defined in claim 10 wherein said means defining said first circuitous path includes separation means for subjecting the incremental volumes of screened particles and slurry exchanged from said first circuitous path to said second circuitous path to a separation treatment within said second path so as to provide the supply of water pumped along said second circuitous path.

12. Apparatus as defined in claim 11 wherein said means defining said first circuitous path includes pump means for pumping the incremental volumes of liquid exchanged from said second circuitous path to said first circuitous path along said first circuitous path back into said vessel.

13. Apparatus as defined in claim 10 wherein said exchanging means includes a housing having first and second pairs of opposed openings in said first and second circuitous paths respectively and a power driven rotor within said housing having through pockets operable in response to the rotation of said rotor to effect said exchanges.

14. Apparatus as defined in claim 10, 11, 12 or 13 wherein said continuous separating means is operable to provide a smaller particle fraction and means is provided for feeding said smaller particles fraction back into said vessel at a position remote from said second withdrawal position.

15. Apparatus as defined in claim 14 wherein said continuous separating means comprises a hydrocyclone.

* * * * *